United States Patent
Fei et al.

(10) Patent No.: US 10,606,964 B2
(45) Date of Patent: Mar. 31, 2020

(54) INLET SPACING ON ROAD GRADES

(71) Applicant: Autodesk, Inc., San Rafael, CA (US)

(72) Inventors: Xiaoming Fei, Shanghai (CN); Weihua Zhong, Shanghai (CN); Lei Hua, Shanghai (CN); Tianzuo Zhou, Shanghai (CN); Jianwen Huang, Shanghai (CN); Zeyi Xia, Shanghai (CN); Yimeng He, Beijing (CN)

(73) Assignee: AUTODESK, INC., San Rafael, CA (US)

( * ) Notice: Subject to any disclaimer, the term of this patent is extended or adjusted under 35 U.S.C. 154(b) by 255 days.

(21) Appl. No.: 15/628,274

(22) Filed: Jun. 20, 2017

(65) Prior Publication Data

US 2018/0365348 A1 Dec. 20, 2018

(51) Int. Cl.
| | |
|---|---|
| *G06F 17/50* | (2006.01) |
| *G01S 13/90* | (2006.01) |
| *E01C 11/22* | (2006.01) |
| *E01C 1/00* | (2006.01) |

(52) U.S. Cl.
CPC .......... *G06F 17/5004* (2013.01); *E01C 1/002* (2013.01); *E01C 11/221* (2013.01); *E01C 11/227* (2013.01); *G01S 13/90* (2013.01); *G06F 2217/04* (2013.01); *G06F 2217/34* (2013.01)

(58) Field of Classification Search
CPC ............. G06F 17/5004; G06F 2217/04; G06F 2217/34; E01C 11/22
USPC ................................................. 703/2, 5, 6, 1
See application file for complete search history.

(56) References Cited

U.S. PATENT DOCUMENTS

| | | | | |
|---|---|---|---|---|
| 6,379,543 B1* | 4/2002 | Bowman | .............. | B01D 24/007 |
| | | | | 210/170.03 |
| 6,832,635 B2* | 12/2004 | Kruger | ...................... | E03B 3/03 |
| | | | | 141/115 |
| 7,981,300 B2* | 7/2011 | Wacome | ............... | E03F 5/0401 |
| | | | | 210/164 |
| 2005/0155285 A1* | 7/2005 | Urban | ................ | A01G 13/0237 |
| | | | | 47/32.7 |
| 2012/0288330 A1* | 11/2012 | Altinier | ................. | E01C 11/227 |
| | | | | 405/43 |
| 2017/0004230 A1* | 1/2017 | Choudhary | ......... | G06F 17/5004 |

OTHER PUBLICATIONS

"Street, Inlets, and Storm Drains", Chapter 7, Jan. 2016, pp. 1-64.
(Continued)

*Primary Examiner* — Thai Q Phan
(74) *Attorney, Agent, or Firm* — Gates & Cooper LLP

(57) ABSTRACT

A method, system, apparatus, and computer program products provides the ability to dynamically define and generate inlet spacing along a road in a building information model (BIM) computer aided design (CAD) three dimensional (3D) model. A representation of a road is acquired in the BIM CAD 3D model, wherein the representation includes a geometry. An inlet spacing is defined for the road. Inlet locations for inlets are determined based on the inlet spacing. A determination is made regarding whether the inlet spacing and inlets satisfy design rules for the road. When the inlet spacing and/or inlets fail to satisfy the design rules, a different inlet spacing is selected from a group of preset integers, and the process repeats until the design rules are satisfied.

16 Claims, 9 Drawing Sheets

(56) References Cited

OTHER PUBLICATIONS

"Storm Drainage Systems", Chapter 8, Drainage Manual, Aug. 30, 2000, pp. 1-52.
"Calculating Spread and Checking Intake Location", Iowa DOT—Office of Design, Sep. 1, 1995, pp. 1-7.
"AutoCAD Civil 3D Hydraflow Storm Sewers Extension—Users Guide", Autodesk, 2010, pp. 1-90.
Urban Drainage Design Manual, Publication No. FHWA-NHI-10-009, Hydraulic Engineering Circular No. 22, Third Edition, U.S. Department of Transportation—Federal Highway Administration, Sep. 2009, pp. 1-458.

* cited by examiner

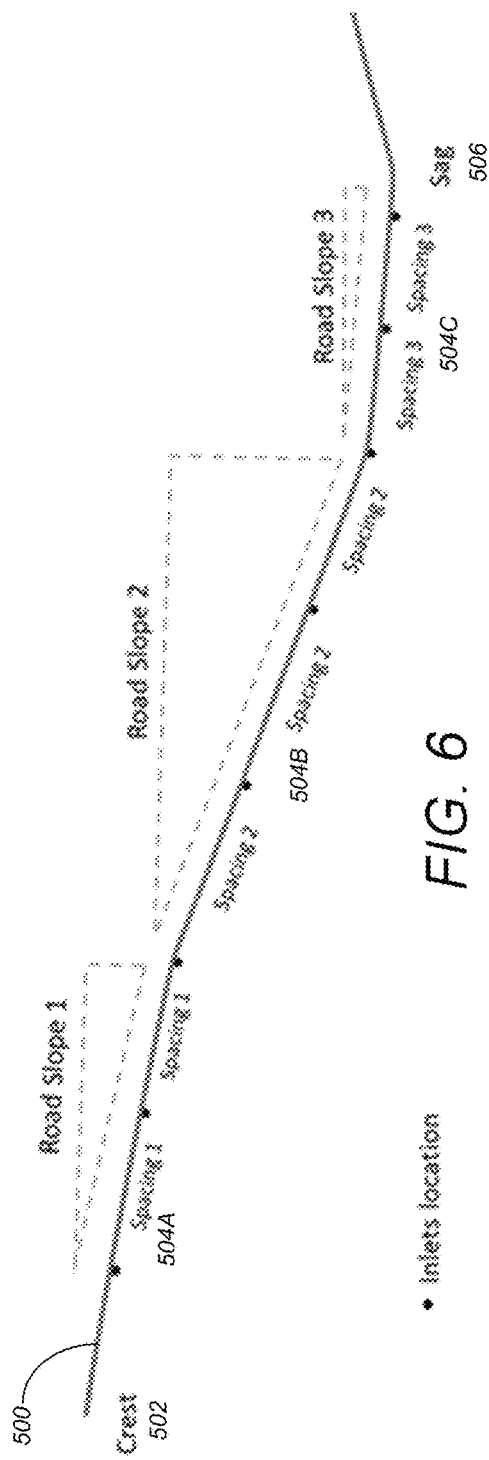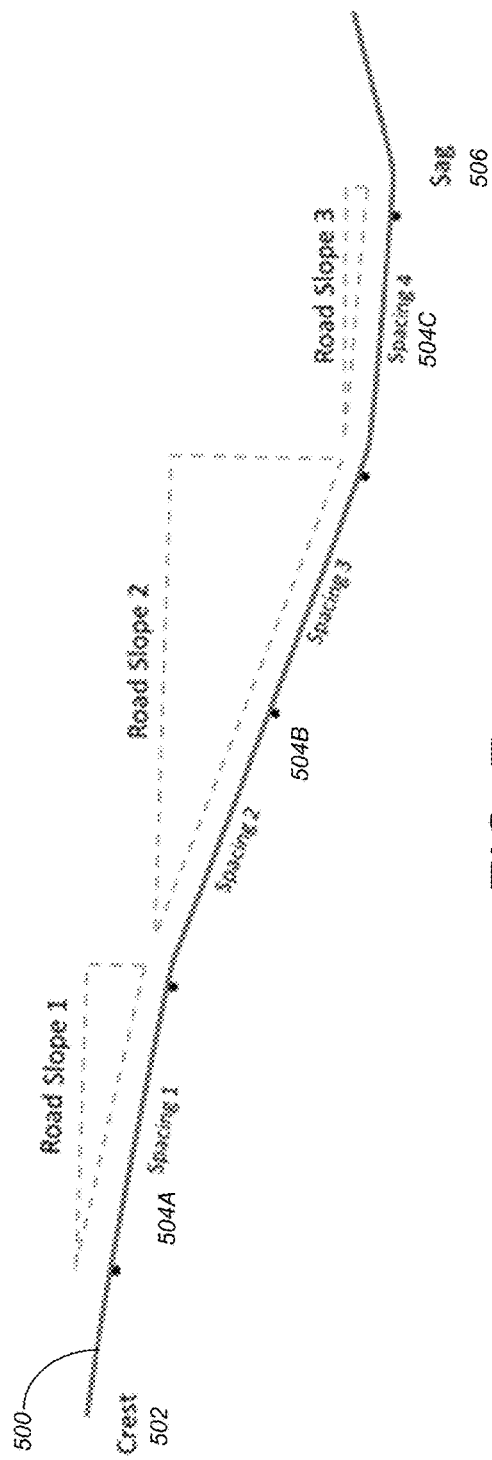
FIG. 6
FIG. 7

INLET SPACING ON ROAD GRADES

BACKGROUND OF THE INVENTION

1. Field of the Invention

The present invention relates generally to building information models, and in particular, to a method, apparatus, and article of manufacture for automatically spacing inlets along a road grade in a building information model (BIM) computer aided design (CAD) three-dimensional (3D) model (and designing/constructing a road with inlets based thereon).

2. Description of the Related Art

Inlets collect storm water from streets and other land surfaces, transition the flow into storm drains, and provide maintenance access to a storm drain system. When adding inlets for a road, significant work is required to configure proper inlet spacing on a road grade (e.g., from the highest point to the lowest), because there are various factors/considerations that must be taken into account. In particular, inlet spacing calculation results differ depending on whether cost is a priority or construction is a priority (e.g., whether cost is a priority compared to construction efficiency as a priority). Further, even if construction is the only priority, prior art systems require users to manually compute spacing for each inlet on an individual basis and if the final inlet computation fails, the user is required to repeat the entire inlet spacing computation process again starting with the first inlet spacing computation. Such prior art systems are time consuming, prone to error, and are infeasible on a large scale basis. Accordingly, what is needed is a system that automatically computes inlet spacing on a road grade based on a variety of factors. To better understand the invention, some background information on inlets and inlet spacing computations may be useful.

FIG. 1 illustrates a bird's eye view of inlet spacing in a drainage network design. The road 100 has two inlets 102A and 102B (collectively referred to herein as inlets 102). The spacing between the two inlets 102 is referred to as the inlet spacing 104. As used herein, the spread 106 refers to a measure of the transverse lateral distance from the curb/curb face 108 to the limit 110 of the water flowing on the roadway. The depth 112 refers to the depth of the flow (i.e., "flow depth") at the curb 108. The spread 106 on the pavement and depth 112 at the curb 108 are often used as criteria for spacing pavement drainage inlets 102.

There are four major types of inlets 102: grate (a drainage inlet composed of a grate in the roadway section or at the roadside in a low point, swale, or channel), curb opening (a drainage inlet consisting of an opening in the roadway curb), slotted (a drainage inlet composed of a continuous slot built into the top of a pipe that serves to intercept, collect, and transport the flow), and combination (an inlet composed of a combination of other inlet types, e.g., curb-opening+grate, grate+slotted, etc.).

As described above, when adding inlets 102 to a road/road design, results vary depending on whether cost is a priority or construction is a priority. For cost savings, an engineer desires to minimize the number of inlets 102 used on a road. Accordingly, the inlet spacing 104 (i.e., the spacing between two inlets 102) should be as large as possible and will not be fixed. However, if construction and maintenance is a priority, the engineer desires fixed inlet spacing 104 (e.g., to minimize the calculations necessary).

For example, with fixed inlet spacing, the engineer desires to keep spacing as integers (e.g., 120 m, 115 m, 110 m, etc.). In this regard, fixed inlet spacing is preferable for construction and maintenance. Since a downstream inlet is influenced by all upstream inlets, if the downstream inlet spacing 104 is exceeded, it is necessary to adjust all inlets 102 with the same road geometry. However, the inlet spacing calculation changes with a change in the road geometry. FIG. 2 illustrates a profile view of a section change on a road grade. As illustrated, the road geometry changes from a first configuration 202 to a second configuration 204. One would not want to fix inlet spacing 104 if the road geometry changes. In addition to the above, for drainage safety, inlet spacing 104 should be small enough to make the spread 106 meet the "spread rule" (described below). As used herein, an exemplary spread rule is set forth in Publication No. FWHA-NH1-10-009 (September 2009, Revised August 2013) entitled Hydraulic Engineering Circular No. 22, Third Edition, Urban Drainage Design Manual (referred to as HEC22), which is incorporated by reference herein. In particular, Table 4-1 from HEC22 illustrates such an exemplary spread rule where larger inlet spacing will cause a larger spread, and the spread rule is used to check if a proposed inlet spacing is reasonable:

TABLE 4-1

Suggested Minimum Design Frequency and Spread.

| Road Classification | | Design Frequency | Design Spread |
|---|---|---|---|
| High Volume or Divided or Bi-Directional | <70 km/hr (45 mph) | 10-year | Shoulder + 1 m (3 ft) |
| | >70 km/hr (45 mph) | 10-year | Shoulder |
| | Sag Point | 50-year | Shoulder + 1 m (3 ft) |
| Collector | <70 km/hr (45 mph) | 10-year | ½ Driving Lane |
| | >70 km/hr (45 mph) | 10-year | Shoulder |
| | Sag Point | 10-year | ½ Driving Lane |
| Local Streets | Low ADT | 5-year | ½ Driving Lane |
| | High ADT | 10-year | ½ Driving Lane |
| | Sag Point | 10-year | ½ Driving Lane |

In view of the above, what is needed is a system that enables the automated design and configuration of a drainage system/network that considers all relevant factors upon which the drainage system is dependent.

SUMMARY OF THE INVENTION

Today's fast paced environment requires quick results and decision making. Embodiments of the present invention are directed to automating the designing of a drainage system along a road network in a BIM 3D model, based on the geometry of the road network and its surrounding conditions in a dynamic manner.

Accordingly, embodiments of present invention may provide one of more of the following attributes:

1. Complete automation of an otherwise mundane and daunting design process of a holistic drainage system for a road network;

2. User configurable rules for controlling placement of the drainage components relative to each other and to the road geometry;

3. Provides suggestions for design elements such as the outfall locations of the drainage system; and 4. Calculates and suggests a pond location and approximate sizing.

BRIEF DESCRIPTION OF THE DRAWINGS

Referring now to the drawings in which like reference numbers represent corresponding parts throughout:

FIG. 6 illustrates inlet spacing results based on application of a method that fixes spacing where construction is a priority in accordance with one or more embodiments of the invention;

FIG. 7 illustrates inlet spacing results based on application of a method that does not fix spacing where cost is a priority in accordance with one or more embodiments of the invention;

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview of Logical Flow

Figure 1:
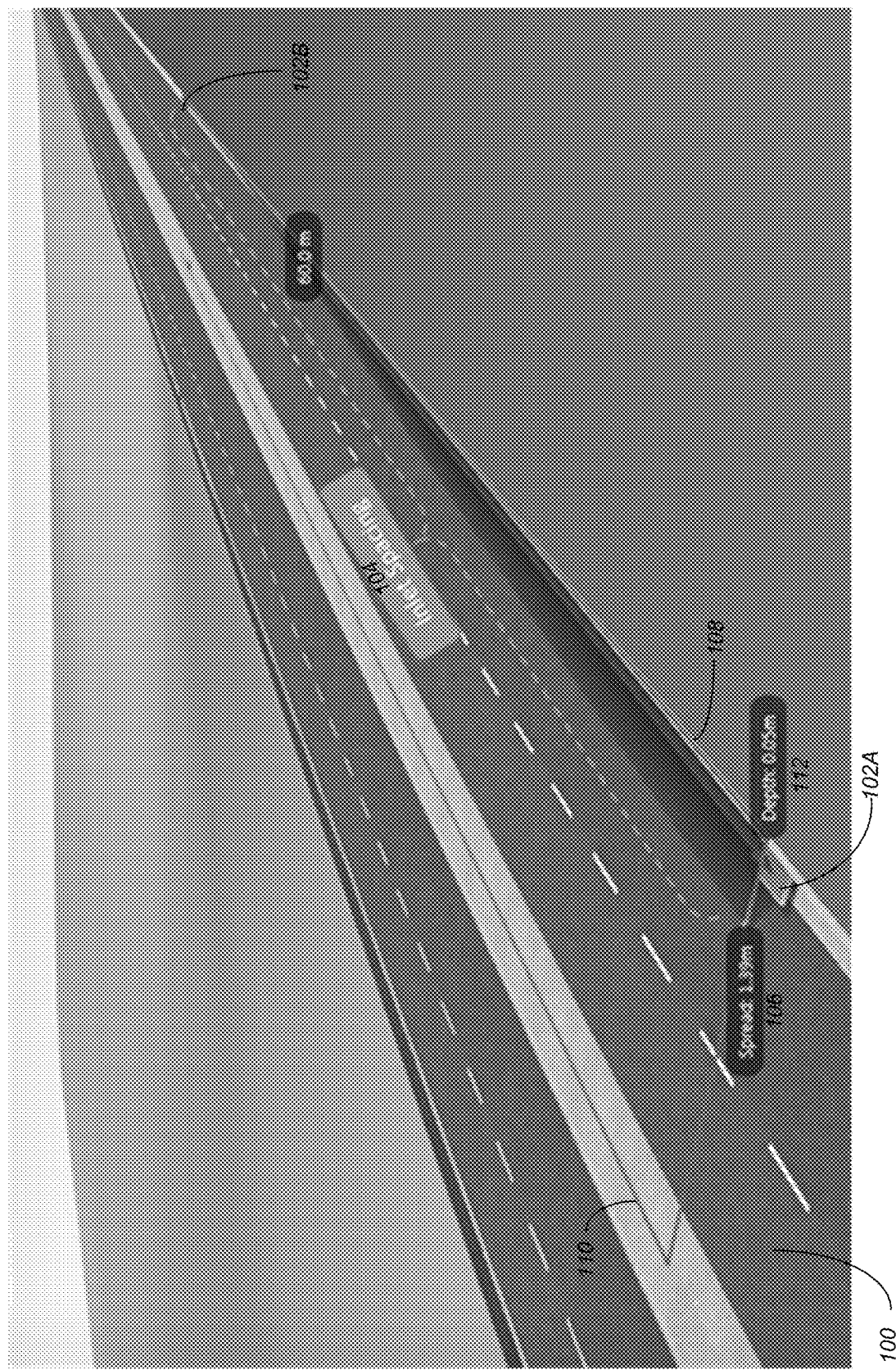
FIG. 1 illustrates a bird's eye view of inlet spacing in a drainage network design.
Figure 2:
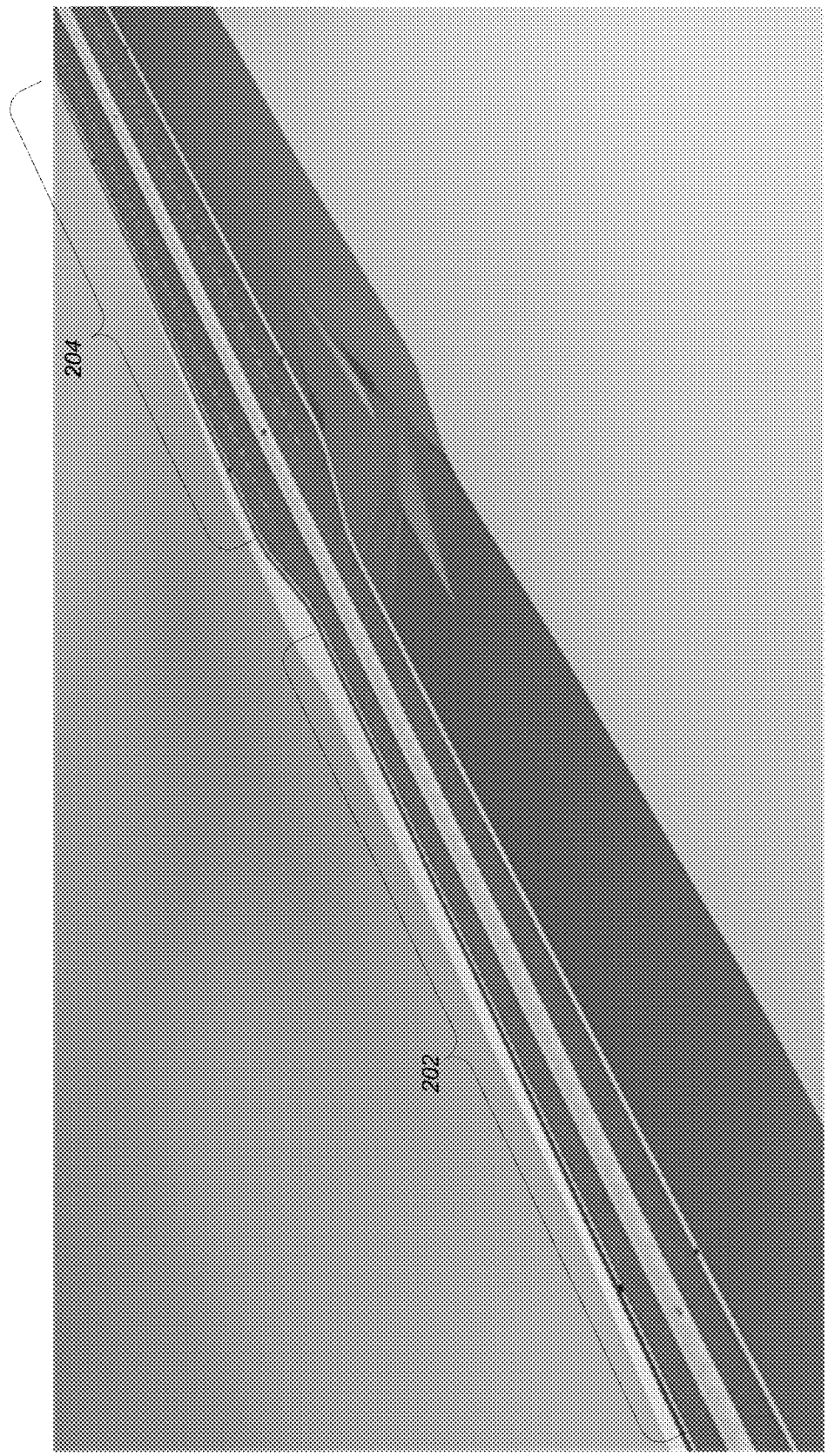
FIG. 2 illustrates a profile view of a section change on a road grade.
Figure 3:
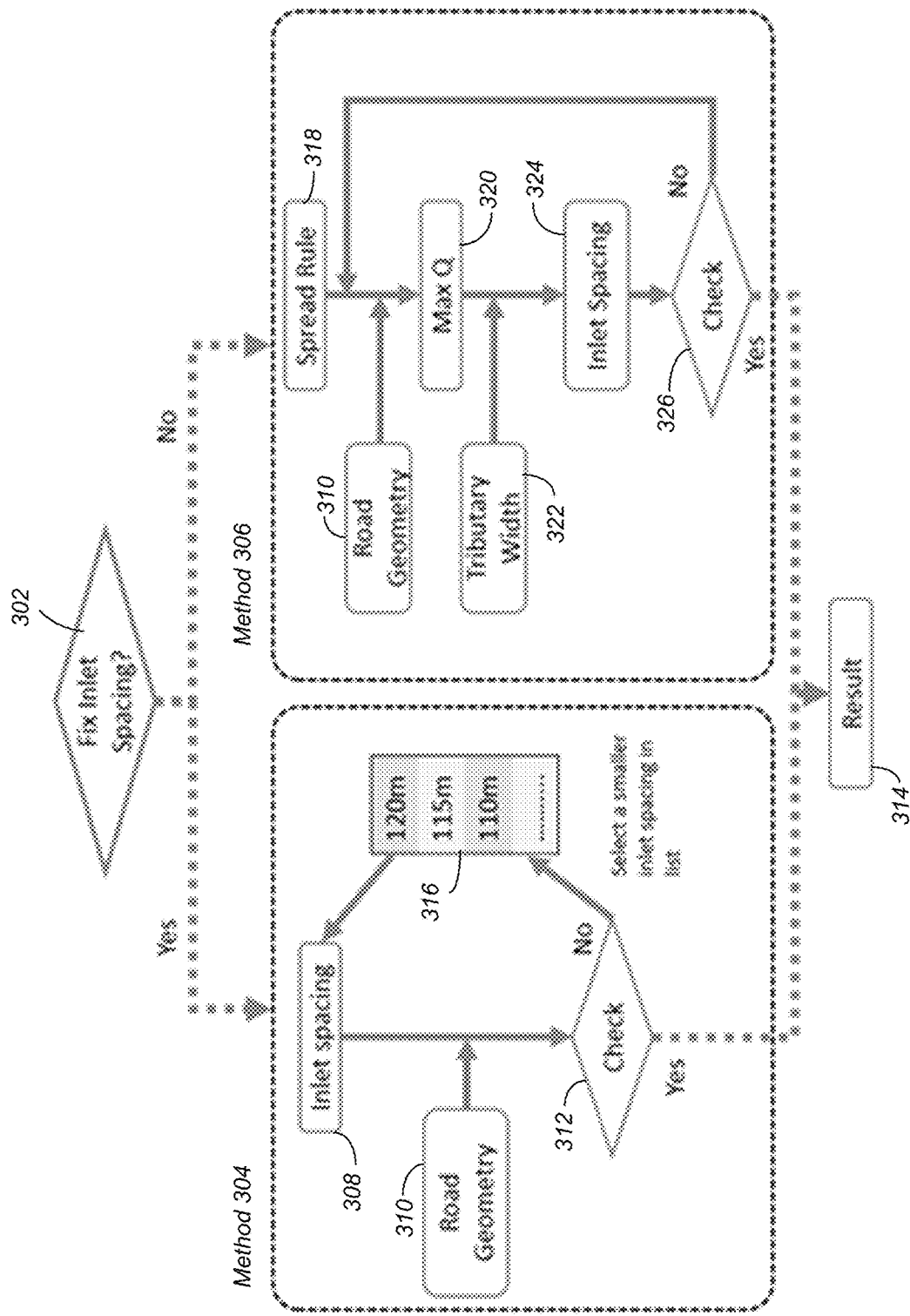
FIG. 3 illustrates an overview of the logical flow for determining inlet spacing in accordance with one or more embodiments of the invention.

FIG. 3 illustrates an overview of the logical flow for determining inlet spacing in accordance with one or more embodiments of the invention. As described above, one of the problems is that inlet spacing calculations for cost priority and construction priority are different. For construction and maintenance, an engineer wants to fix inlet spacing (i.e., fixed integer based inlet spacing). However, for cost savings, the engineer wants to minimize the number of inlets in some cases. Accordingly, for cost savings, inlet spacing should be as large as possible and will not be fixed.

At step 302, an engineer may choose to fix inlet spacing or not. If the engineer elects to fix inlet spacing, the process proceeds with method 304. If the engineer elects not to fix inlet spacing, the process proceeds with method 306. In method 304 (construction priority), inlet spacing will be fixed if the road geometry is not changed. In method 306 (cost priority), inlet spacing will not be fixed and the largest inlet spacing will be used to meet the cost savings.

In method 304, for construction priority, inlet spacing is fixed. The engineer desires to keep inlet spacing as integers, such as 120 m, 115 m, and 110 m. In this regard, fixed inlet spacing is better for construction and maintenance. However, several problems arise with fixed inlet spacing. For example, since the downstream inlet will be influenced by all upstream inlets, if a downstream inlet spread is exceeded, it is necessary to adjust all inlets with the same road geometry. Further, if the road geometry changes, the inlet spread calculation will be different. Accordingly, with a change in road geometry, it is not proper to keep the inlet spacing the same. Further, the inlet spacing should be small enough to meet/comply with the spread rule.

To resolve the problems with fixed inlet spacing, one or more embodiments of the invention determine inlet spacing results automatically (e.g., without additional user input). At step 308, the inlet spacing (e.g., base fixed inlet spacing) is acquired/determined/defined. The road geometry 310 is then input/received. At step 312 a check is conducted. The check 312 determines whether the current inlet spacing satisfies all (or one or more) of the necessary conditions/design rules (e.g., complies with the spread rule [e.g., if the downstream inlet spacing is exceeded], keeps inlet spacing as integers, etc.). For example, if the road geometry 310 has changed, the check will fail. Similarly, if the spacing is larger than a minimum, the check will fail. If all of the conditions pass, the results are provided/output at step 314. However, if the check fails, a smaller/different inlet spacing from the list 316 is selected and the process continues at 308 with the newly selected smaller inlet spacing. In step 314, the results may be provided in the form of a blueprint, a physical printed document, an electronic document, etc. Further, step 314 may also include constructing the inlets in accordance with the inlet spacing and configuration along the road (i.e., at the inlet locations) as determined in the prior steps.

Referring to method 306, the spread rule is provided at 318. Based on the road geometry 310 and the spread rule 318, a maximum flow (Q) is determined at step 320. The tributary width 322 is received/input. Based on the max Q and tributary width, the inlet spacing 324 is determined. The check 326 determines whether the road geometry has changed. The road geometry at an inlet location will influence spread calculations. Accordingly, if the road geometry has changed, the max flow (Q) determined at step 320 will be meaningless. Accordingly, if the road geometry has changed, the process returns to step 320 to recalculate max Q. Such a process ensures that the max inlet spacing is acquired.

Figure 4A:
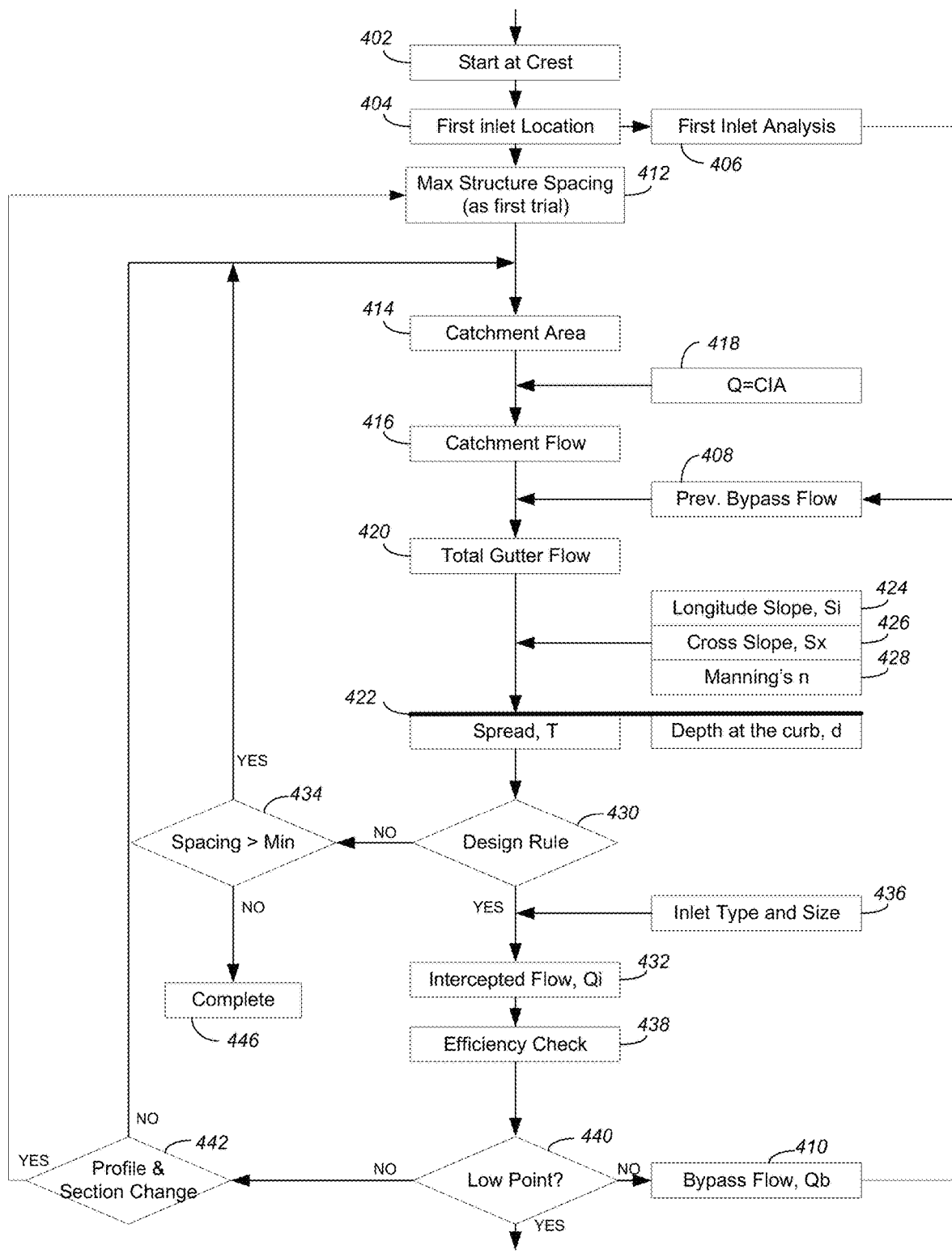
FIG. 4A illustrates the detailed logical flow for method for fixed inlet spacing (construction priority) in accordance with one or more embodiments of the invention.
Figure 4B:
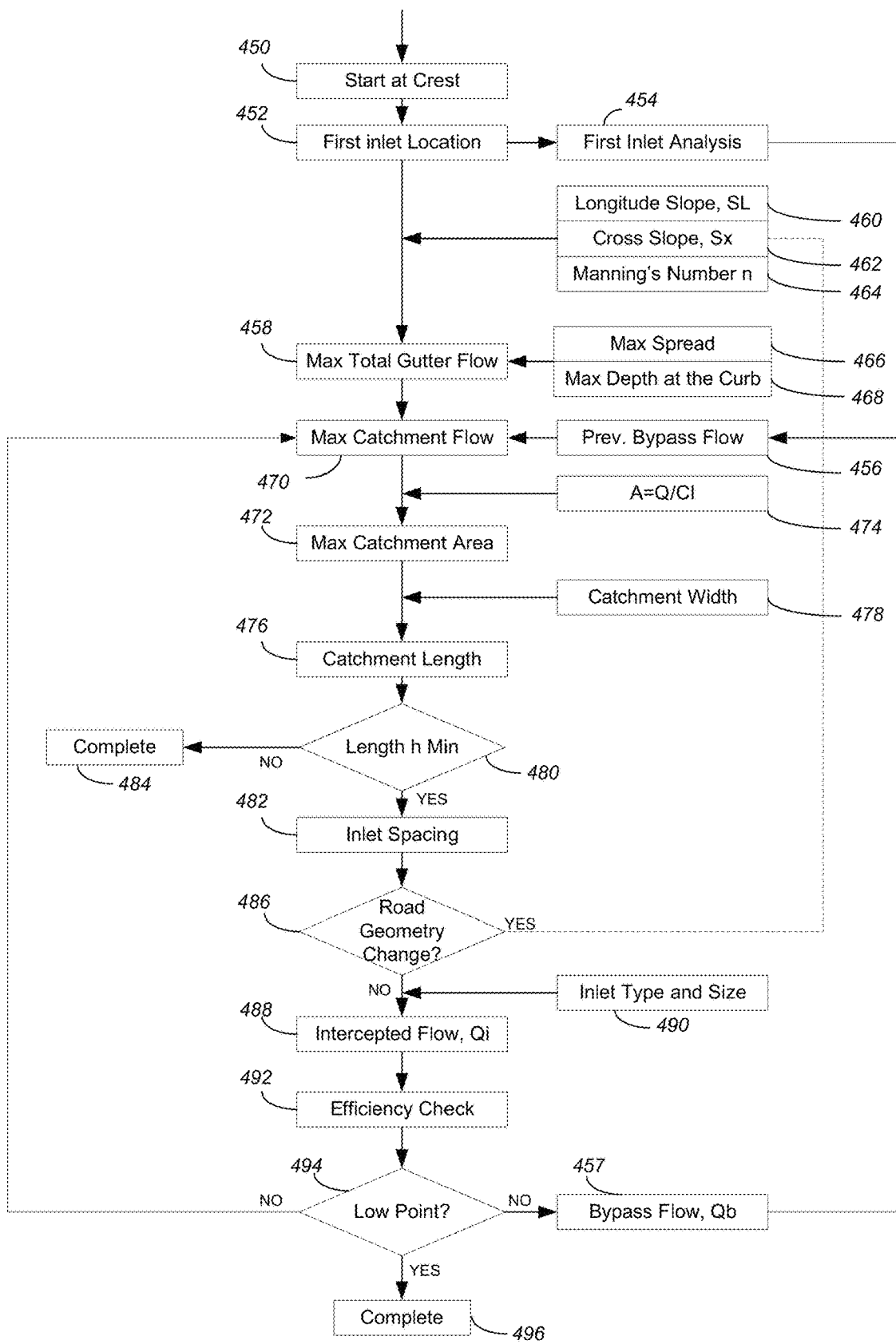
FIG. 4B illustrates the detailed logical flow for method where cost is a priority in accordance with one or more embodiments of the invention.

While FIG. 3 provides an overview of the logical flow, FIGS. 4A and 4B provide the details for method 304 and method 306 respectively.

Detailed Logical Flow

FIG. 4A illustrates the detailed logical flow for method 304 for fixed inlet spacing (construction priority) in accordance with one or more embodiments of the invention. As an overview, embodiments of the invention keep inlet spacing as integers.

The process starts/begins from the crest (highest point) of a road segment at step 402. At step 404, the location of the first inlet (e.g., as a distance from the crest), is determined/calculated based on the allowable spread. To determine the location of the first inlet, Manning's number may be integrated for an increment of width across a section. The resulting equation that may be used is:

$$T=[(Qn)/(K_u S_x^{1.67} S_L^{0.5})]^{0.375}$$

where $K_u$=0.376, n=Manning's coefficient, Q=Flow rate (m³/s or ft³/s), T=width of flow (spread), $S_x$=cross slope, and $S_L$=longitudinal slope.

In addition, an analysis of the first inlet is conducted at step 406. The analysis analyzes the inlet performance including acquiring/determining the depth of the flow (at the first inlet) as well as bypass flow (i.e., previously bypass flow 408 and bypass flow 410). To determine the first inlet flow, the equation $Q=(CIA)/K_u$ may be used, where Q is the flow, C is the dimensionless runoff coefficient (a value that is a function of the ground cover and a host of other hydrologic abstractions that relates the estimated peak discharge to a theoretical maximum of 100% runoff), I is the rainfall intensity (mm/hr or in/hr), A is the drainage area (e.g., in hectares or acres), and $K_u$ is the units conversion factor equal to 360. When performing such a computation, the following assumptions may be made: peak flow occurs when the entire watershed is contributing to the flow; rainfall intensity if the same over the entire drainage area; rainfall intensity is uniform over a time duration equal to the time of concentration, wherein the time of concentration is the time required for water to travel from the hydraulically most remote point of the basin to the point of interest; the frequency of the computer peak flow is the same as that of the rainfall intensity (i.e., the 10-year rainfall intensity is assumed to produce the 10-year peak flow); and the coefficient of the runoff is the same for all storms of all recurrence probabilities.

At step 412, the maximum structure spacing is assumed as the next inlet spacing (as the first trial from the first inlet location).

At step 414, the catchment area is computed/determined based on the inlet spacing and the corresponding catchment length is calculated. As used herein, catchment is the action of collecting water and the catchment area is the area from which rainfall flows into the drainage system.

At step 416, the catchment flow (the flow from the catchment area) a catchment area) is calculated/computed/determined. Such a determination may be based on a rational method (e.g., Q=CIA 418, where Q is the flow, C is a dimensionless runoff coefficient, I is the rainfall intensity, and A is the drainage area).

At step 420, the total gutter flow is determined/calculated:

Total Gutter Flow=Catchment Flow+Previous Inlet Bypass Flow 408

In other words, the total gutter flow is the flow that is intercepted/caught by the inlet/gutter and consists of the catchment flow (i.e., the flow intercepted by the inlet/catchment)+the carryover/previous bypass flow 408. Similarly, the flow that is not intercepted by an inlet is termed carryover or bypass and is defined as: $Q_b=Q-Q_i$, where $Q_b$ is the bypass flow, Q is the total gutter flow, and $Q_i$ is the intercepted flow.

At step 422, the spread T and depth at the curb d are determined/computed based on the assumed inlet location. To compute the spread T and depth d, the Longitude Slope $S_L$ 424, Cross Slope $S_x$ 426, and the Manning's number n 428 may be utilized. Similar to step 404, the spread T may be computed as $T=[(Qn)/(K_u S_x^{1.67} S_L^{0.5})]^{0.375}$ and the depth d may be computed as $d=T S_x$.

At step 430, the spread T and depth d are checked to determine whether they meet the design rule. For example, the design rule may require that the spread T is smaller than the allowable spread and the depth d is less than the curb height. Table A below provides the suggested minimum design frequency and spread that may be utilized in accordance with one or more embodiments of the invention:

TABLE A

| Road Classification | | Design Frequency | Design Spread |
| --- | --- | --- | --- |
| High Volume or Divided or Bi-Directional | <70 km/hr (45 mph) | 10-year | Shoulder + 1 m (3 ft) |
| | >70 km/hr (45 mph) | 10-year | Shoulder |
| | Sag Point | 50-year | Shoulder + 1 m (3 ft). |
| Collector | <70 km/hr (45 mph) | 10-year | ½ Driving Lane |
| | >70 km/hr (45 mph) | 10-year | Shoulder |
| | Sag Point | 10-year | ½ Driving Lane |
| Local Streets | Low ADT | 5-year | ½ Driving Lane |
| | High ADT | 10-year | ½ Driving Lane |
| | Sag Point | 10-year | ½ Driving Lane |

When the spread and depth comply with the design rule, the process continues with step 432. When the spread and depth fail to comply with the design rule, the process continues with step 434.

At step 432, the intercepted flow and efficiency is determined/calculated (e.g., based on inlet type and size 436). More specifically, for different inlet types, the intercepted flow calculation equations may not be the same. Further, different equations may be used to compute frontal flow, side flow, efficiencies, etc. As an example, the following equations are used to calculate flow and efficiency for a grate inlet. The ratio of frontal flow to total gutter flow, $E_0$, for a uniform cross slope may expressed as:

$$E_o = \frac{Q_w}{Q} = 1 - \left(1 - \frac{W}{T}\right)^{2.67}$$

where Q is the total gutter flow, $Q_w$ is the flow in width W, W is the width of the depressed gutter or grate, and T is the total spread of water. The ratio of slide flow, $Q_s$ to total gutter flow is:

$$Q_s/Q=1-(Q_w/Q)=1-E_o$$

The ratio of frontal flow intercepted to total frontal flow, $R_f$, is:

$$R_f=1-K_u(V-V_o)$$

where $K_u$ is 0.295, V is the velocity of flow in the gutter, and $V_o$ is the gutter velocity where splash-over first occurs. The ratio of side flow intercepted to total side flow, $R_s$, or side flow interception efficiency, is:

$$R_S = 1\bigg/\left(1 + \frac{K_u V^{1.8}}{S_X L^{2.3}}\right)$$

where $K_u$ is 0.0828. The efficiency, $E_o$, of a grate may be computed as:

$$E-R_f E_o+R_s(1-E_o)$$

The frontal flow to total gutter flow ratio, $E_o$, for composite gutter sections assumes a frontal flow width equal to the depressed gutter section width. The use of this ratio when determining a grate's efficiency requires that the grate width be equal to the width of the depressed gutter section, W. If a grate having a width less than W is specified, the gutter flow ratio, $E_o$, must be modified to accurately evaluate the grate's efficiency. Because an average velocity has been assumed for the entire width of gutter flow, the grate's frontal flow ratio, $E'_o$, can be calculated by multiplying $E_o$ by a flow area ratio. The area ratio is defined as the gutter flow area in a width equal to the grate width divided by the total flow area in the depressed gutter section. This adjustment is represented as:

$$E_o'=E_o(A_w'/A_w)$$

where $E'_o$ is the adjusted frontal area ratio for grates in composite cross sections, $A'_w$ is the gutter flow area in a width equal to the grate width, and $A_w$ is the flow area in depressed gutter width. Further, the interception capacity of a grate inlet on a grade is equal to the efficiency of the grate multiplied by the total gutter flow:

$$Q_i=E\ Q=Q[R_fE_o+R_s(1-E_o)]$$

At step 438, the efficiency of the inlet is checked and a warning is shown if the efficiency is too low (e.g., below a threshold value). In this regard, inlet interception capacity, $Q_i$, is the flow intercepted by an inlet under a given set of conditions. The efficiency of an inlet, E, is the percent of total flow that the inlet will intercept for those conditions. The efficiency of an inlet changes with changes in cross slope, longitudinal slope, total gutter flow, and, to a lesser extent, pavement roughness. For example, inlet efficiency E, may be computed as $Q_1/Q$ where Q is the total gutter flow, and $Q_i$ is the intercepted flow.

At step 440, a determination is made regarding whether the inlet is at a low point (sag point). When the inlet is at a low point, the process is complete and the bypass flow is provided to the downstream inlet. When the inlet is not at a low point, the process continues with step 442. At the same time, the value of bypass flow (410) will go to step 408. This bypass flow, Qb, will be considered as "Previous Bypass Flow" in next inlet calculation.

At step 442, a check is made regarding whether the road profile or section has changed. When the road profile/section has changed, the process continues with step 412 where a new group (also referred to as a new group segment) is started and the maximum structure spacing is used as the inlet spacing in the new road area/group/segment. When the road profile/section has not changed, the next inlet location is calculated using the last inlet spacing and the process continues at step 414.

At step 434 (i.e., when the spread and depth do not meet the design rule), a check is made regarding whether the spacing is larger than the minimum (i.e., minimum spacing will provide a minimum spread and depth). In this regard, at this stage, the inlet spacing is smaller than maximum value (since in step 412 the calculation starts from maximum value as first trial). If the inlet spacing is still greater than the minimum spacing (i.e., the inlet spacing can be further reduced), the inlet spacing is decreased after step 434. In other words, if the spacing is larger than the minimum, the inlet spacing is decreased, the first inlet location is determined based on the decreased inlet spacing, and the process begins again from the first inlet in the group with the new spacing at step 414. In this regard, the alternative inlet spacing may be a group of definite/predefined numbers (e.g., 120 m, 115 m, 110 m, etc.). The group can also be a distance in which the inlet spacing should be the same. If the spacing is less than or equal to the minimum, the process is complete at step 446 such that there is no available result and a suggestion is provided to the user to change the road design. Alternatively, as described herein, if the minimum spread and depth fail to comply with the design rule, the calculation will be completed at step 484 (i.e., no reasonable inlet spacing is possible).

FIG. 4B illustrates the detailed logical flow for method 306 where cost is a priority in accordance with one or more embodiments of the invention. At step 450, the calculation starts from a crest (i.e., the highest point) of a road segment.

At step 452, the first inlet location (based on the distance from the crest) is calculated using an allowable spread. In addition, at step 452, an analysis 454 of the first inlet performance is conducted. The analysis 454 analyzes the inlet performance including acquiring/determining the depth of the flow (at the first inlet) as well as bypass flow 408 and 410. In particular, the methods/computations described above with respect to steps 404 and 406 may be similarly used in method 306.

At step 458, the maximum total gutter flow is calculated/determined using the road geometry (including the longitude slope $S_L$ 460, cross slope $S_x$ 462, and Mannings Number n 464), the maximum spread 466 and maximum depth at the curb 468. Similar computations to that described above with respect to step 422 may be used in step 458. Further, the catchment area is output at step 458. Thus, the maximum total gutter flow is a result of the max total gutter flow calculation at step 458.

At step 470, the maximum catchment flow is calculated/determined:

Catchment Flow=Total Gutter Flow–Previous Inlet bypass flow In the calculations, the bypass flow 457 of the last inlet is used as the previous bypass flow 456. In this regard, flow that is not intercepted by an inlet is termed carryover or bypass and is defined as $Q_b=Q-Q_i$, where $Q_b$ is the bypass flow, Q is the total gutter flow, and $Q_i$ is the intercepted flow.

At step 472, the maximum catchment area is calculated based on A=Q/CI 474, wherein A is the maximum catchment area, Q is the maximum catchment flow calculated in step 470, C is a coefficient, and I is the rainfall intensity.

At step 476, the catchment length is determined based on the catchment width 478:

$$\text{Length}=\text{Area}/\text{Width}$$

where Length is the catchment length, Area is the maximum catchment area calculated at step 472, and width is the catchment width 478 (that may be determined based on a road cross section calculation). The computations described above with respect to step 416, may be used to determine the maximum catchment area at step 472.

At step 480, the system checks whether the catchment length is larger than or equal to the minimum length. When the catchment length is larger than or equal to the minimum length, the process continues at step 482. However, when the catchment length is less than the minimum, then there is no available result, the process is complete at 484, and the system may provide a suggestion that the user change the road design.

At step 482, the inlet spacing is set/defined as equal to the catchment length. Further, this step may also include placing a current inlet location from a current inlet based on the inlet spacing from a prior inlet location.

At step 486, a check is conducted regarding whether the road geometry changes at the end of the inlet spacing station (i.e., after the current inlet location). When the road geometry changes, the road geometry is updated ($S_x$, $S_L$, and Manning's n), and the process returns to step 458 (i.e., a new group is created for the new road geometry/group segment). When the road geometry does not change, the process continues with step 488.

At step 488, the intercepted flow ($Q_i$) is calculated/determined by the inlet type and size 490. As described above, intercepted flow calculation equations may be different for different inlet types. Example computations for grate inlets described above with respect to step 432 may be used here as well.

At step 492, the efficiency is checked/determined and a warning is shown if the efficiency is too low (e.g., below a threshold value). Similar computations s those described above with respect to step 438 may be used in step 492 as well.

At step 494, a check is conducted to determine whether the inlet is at a low point (sag point) in the road/road geometry. When at a sag point, the process is complete and the inlet spacing and inlet locations for the road are output. When the inlet is not at a sag point, a different inlet spacing is selected and the above steps are repeated. Further, the bypass flow $Q_b$ is computed at 458. The process then returns to step 470. As described above, flow that is not intercepted by an inlet is termed carryover or bypass and is defined as $Q_b=Q-Q_i$, which is the total gutter flow Q minus the intercepted flow $Q_i$.

In view of the above, an engineer/user is able to automatically (i.e., without additional user input) acquire inlet spacing results by keeping inlet spacing as integers. At step 434, if the spacing is larger than the minimum spacing, inlet spacing is decreased. Such a decrease is from a group of preset integers, such as 120 m, 115 m, and 110 m. Accordingly, if the spacing is less than the minimum spacing, the method recalculates all upstream inlets with the same road geometry, in order to keep spacing the same. In step 442, if the road profile and section are not changed, the process returns to step 414. In such a case, the downstream inlet is calculated and the upstream inlet spacing is used as the starting spacing. Such a process ensures that inlet spacing is fixed. Similarly, if the road geometry changes, the inlet spacing also changes. In this regard, in step 442, there is a check for the road geometry (including profile and section). If the road geometry changes, the maximum structure spacing is used as the first trial for the downstream inlet.

Further to the above, for drainage safety, inlet spacing should be small enough to make the spread meet the spread rule. In step 430, there is a design rule check. If the inlet spacing fails to the design rule check, inlet spacing is repeatedly decreased until the rule is met.

Advantages

The logical flows of FIGS. 4A and 4B provide many advantages over the prior art.

Automation of Inlet Spacing Calculations

Embodiments of the invention automate inlet spacing calculations. In the prior art, spacing is an analysis that requires input parameters with users often performing numerous calculations and iterations. Embodiments of the invention do not require the user to perform such calculations and iterations.

Balance Drainage Safety and Cost Saving in the Construction Priority Method

In step 412, the maximum structure spacing is used as the first assumption. If the rule check fails in step 430, the spacing is decreased and the process repeats until the rule check 430 is successful. This iteration ensures that the biggest proper spacing is used as the last/actual spacing, which means drainage safety is assured for the least cost.

Inlet Spacing Directly Used for Projects

An engineer/user can use the method of FIG. 4A for the convenience of construction and maintenance. In such a method, inlet spacing is a group of integers such as 120 m, 115 m, and 110 m. Inlet spacing values are kept the same if there is no change for the road slope and section. However, if the engineer/user wants to use less inlets to save on costs, the method of FIG. 4B may be used.

Exemplary Uses

Figure 5:
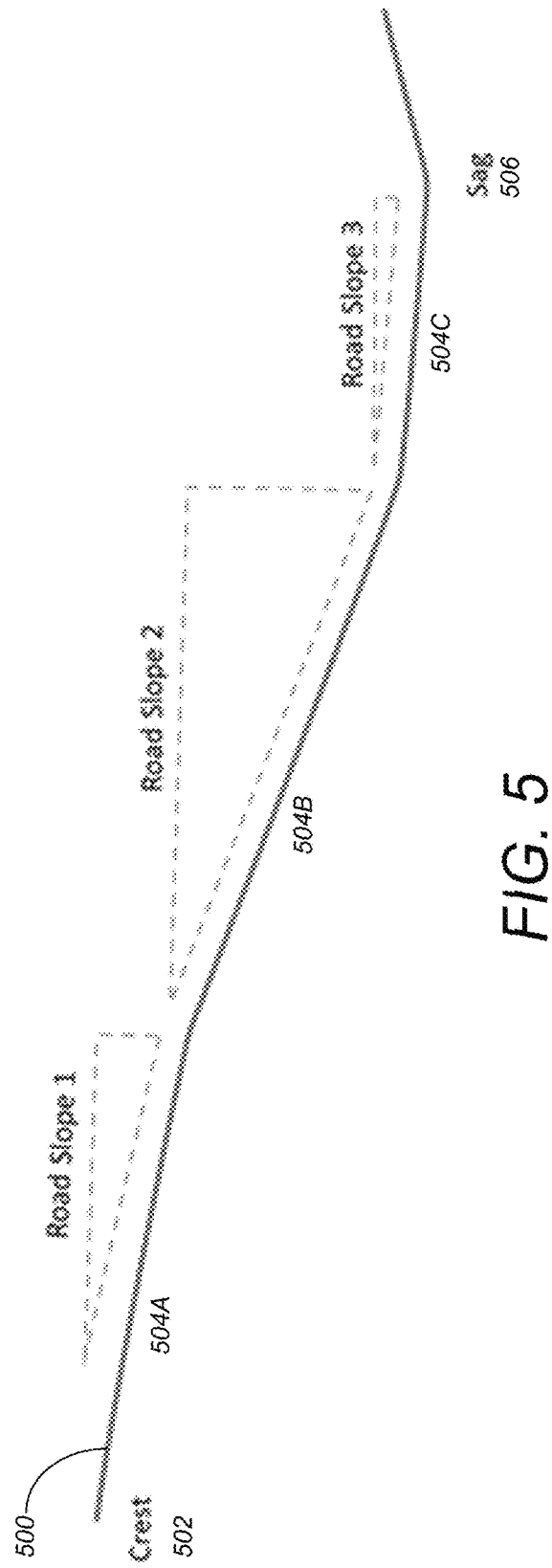
FIG. 5 illustrates a road profile from crest to sag in accordance with one or more embodiments of the invention.

FIG. 5 illustrates a road profile from crest to sag in accordance with one or more embodiments of the invention. As illustrated, the road 500 begins at the crest 502 and has various segments 504A-504C (collectively referred to as road segments 504), and ends at sag 506. Each road segment 504 has a corresponding road slope (i.e., segment 504A—Road Slope 1, segment 504B—Road Slope 2, and segment 504C—Road Slope 3). Once embodiments of the invention have been applied to the road 500 to determine inlet spacing, different methods will produce different results.

FIG. 6 illustrates inlet spacing results based on application of a method that fixes spacing where construction is a priority in accordance with one or more embodiments of the invention. In contrast, FIG. 7 illustrates inlet spacing results based on application of a method that does not fix spacing where cost is a priority in accordance with one or more embodiments of the invention. In both figures, the black dots indicate the inlet locations. As can be seen in both FIG. 6 and FIG. 7, the spacing is on a per road segment 504 basis. In other words, when the road slope of the road changes (thereby defining a road segment 504), the inlet spacing changes.

In FIG. 6, the inlet spacing is fixed (i.e., is the same) if the road slope is not changed. Fixed inlet spacing is preferable for inlet construction and maintenance. As illustrated, for segment 504A, the inlet spacing is "Spacing 1", for segment 504B, the inlet spacing is "Spacing 2", and for segment 504C, the inlet spacing is "Spacing 3".

In contrast to FIG. 6, the inlet spacing in FIG. 7 is larger than that in FIG. 6, which implies that less inlets are used. The use of less inlets is a cost savings. As illustrated in FIG. 7, "Spacing 1" is used as the inlet spacing in segment 504A, while "Spacing 2" and "Spacing 3" are used in segment 504B, and "Spacing 4" is used in segment 504C. As can be seen, there are eight (8) inlets in FIG. 6 compared to five (5) inlets in FIG. 7.

Hardware Environment

Figure 8:
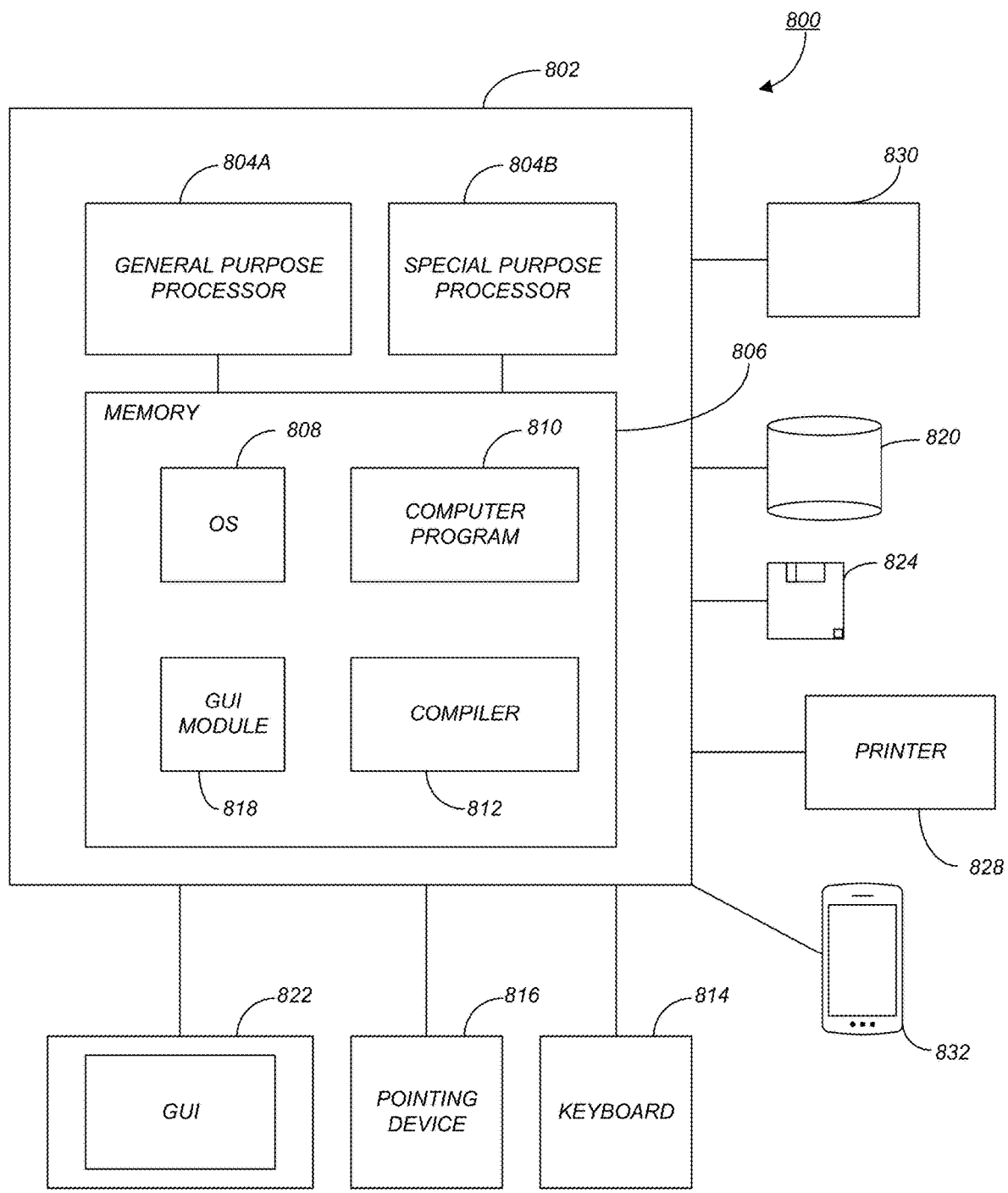
FIG. 8 is an exemplary hardware and software environment used to implement one or more embodiments of the invention.

FIG. 8 is an exemplary hardware and software environment 800 used to implement one or more embodiments of the invention. The hardware and software environment includes a computer 802 and may include peripherals. Computer 802 may be a user/client computer, server computer, or may be a database computer. The computer 802 comprises a general purpose hardware processor 804A and/or a special purpose hardware processor 804B (hereinafter alternatively collectively referred to as processor 804) and a memory 806, such as random access memory (RAM). The computer 802 may be coupled to, and/or integrated with, other devices, including input/output (I/O) devices such as a keyboard 814, a cursor control device 816 (e.g., a mouse, a pointing device, pen and tablet, touch screen, multi-touch device, etc.) and a printer 828. In one or more embodiments, computer 802 may be coupled to, or may comprise, a portable or media viewing/listening device 832 (e.g., an MP3 player, IPOD, NOOK, portable digital video player, cellular device, personal digital assistant, etc.). In yet another embodiment, the computer 802 may comprise a multi-touch device, mobile phone, gaming system, internet enabled television, television set top box, or other internet enabled device executing on various platforms and operating systems.

In one embodiment, the computer 802 operates by the general purpose processor 804A performing instructions defined by the computer program 810 under control of an operating system 808. The computer program 810 and/or the operating system 808 may be stored in the memory 806 and may interface with the user and/or other devices to accept input and commands and, based on such input and commands and the instructions defined by the computer program 810 and operating system 808, to provide output and results.

Output/results may be presented on the display 822 or provided to another device for presentation or further processing or action. In one embodiment, the display 822 comprises a liquid crystal display (LCD) having a plurality of separately addressable liquid crystals. Alternatively, the display 822 may comprise a light emitting diode (LED) display having clusters of red, green and blue diodes driven together to form full-color pixels. Each liquid crystal or pixel of the display 822 changes to an opaque or translucent state to form a part of the image on the display in response to the data or information generated by the processor 804 from the application of the instructions of the computer program 810 and/or operating system 808 to the input and commands. The image may be provided through a graphical user interface (GUI) module 818. Although the GUI module 818 is depicted as a separate module, the instructions performing the GUI functions can be resident or distributed in the operating system 808, the computer program 810, or implemented with special purpose memory and processors.

In one or more embodiments, the display 822 is integrated with/into the computer 802 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD), portable/handheld game/music/video player/console devices (e.g., IPOD TOUCH, MP3 players, NINTENDO 3DS, PLAYSTATION PORTABLE, etc.), touch tables, and walls (e.g., where an image is projected through acrylic and/or glass, and the image is then backlit with LEDs).

Some or all of the operations performed by the computer 802 according to the computer program 810 instructions may be implemented in a special purpose processor 804B. In this embodiment, some or all of the computer program 810 instructions may be implemented via firmware instructions stored in a read only memory (ROM), a programmable read only memory (PROM) or flash memory within the special purpose processor 804B or in memory 806. The special purpose processor 804B may also be hardwired through circuit design to perform some or all of the operations to implement the present invention. Further, the special purpose processor 804B may be a hybrid processor, which includes dedicated circuitry for performing a subset of functions, and other circuits for performing more general functions such as responding to computer program 810 instructions. In one embodiment, the special purpose processor 804B is an application specific integrated circuit (ASIC).

The computer 802 may also implement a compiler 812 that allows an application or computer program 810 written in a programming language such as C, C++, Assembly, SQL, PYTHON, PROLOG, MATLAB, RUBY, RAILS, HASKELL, or other language to be translated into processor 804 readable code. Alternatively, the compiler 812 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 810 accesses and manipulates data accepted from I/O devices and stored in the memory 806 of the computer 802 using the relationships and logic that were generated using the compiler 812.

The computer 802 also optionally comprises an external communication device such as a modem, satellite link, Ethernet card, or other device for accepting input from, and providing output to, other computers 802.

In one embodiment, instructions implementing the operating system 808, the computer program 810, and the compiler 812 are tangibly embodied in a non-transitory computer-readable medium, e.g., data storage device 820, which could include one or more fixed or removable data storage devices, such as a zip drive, floppy disc drive 824, hard drive, CD-ROM drive, tape drive, etc. Further, the operating system 808 and the computer program 810 are comprised of computer program 810 instructions which, when accessed, read and executed by the computer 802, cause the computer 802 to perform the steps necessary to implement and/or use the present invention or to load the program of instructions into a memory 806, thus creating a special purpose data structure causing the computer 802 to operate as a specially programmed computer executing the method steps described herein. Computer program 810 and/or operating instructions may also be tangibly embodied in memory 806 and/or data communications devices 830, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 802.

Figure 9:
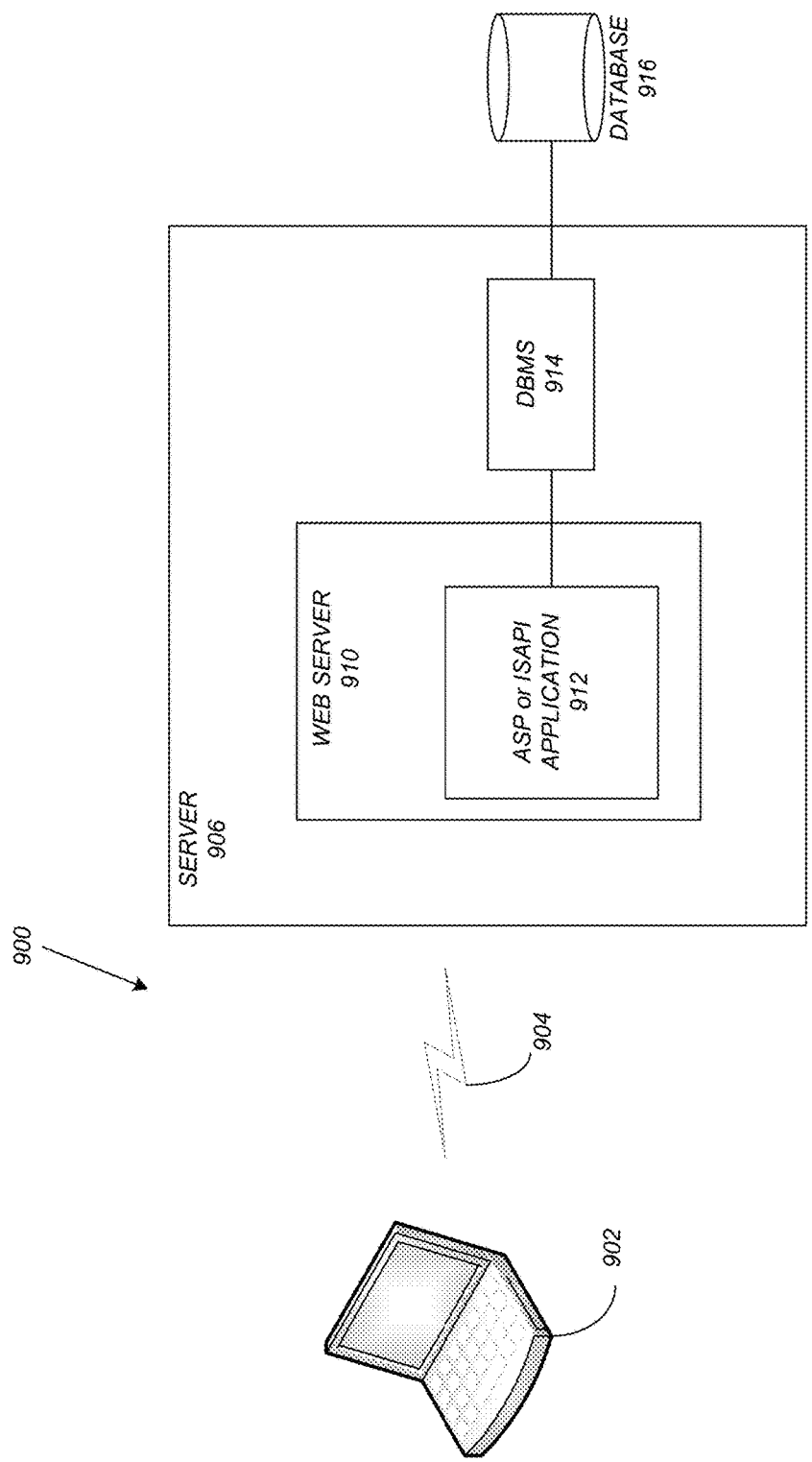
FIG. 9 schematically illustrates a typical distributed/cloud-based computer system using a network to connect client computers to server computers in accordance with one or more embodiments of the invention.

FIG. 9 schematically illustrates a typical distributed/cloud-based computer system 900 using a network 904 to connect client computers 902 to server computers 906. A typical combination of resources may include a network 904 comprising the Internet, LANs (local area networks), WANs (wide area networks), SNA (systems network architecture) networks, or the like, clients 902 that are personal computers or workstations (as set forth in FIG. 8), and servers 906 that are personal computers, workstations, minicomputers, or mainframes (as set forth in FIG. 8). However, it may be noted that different networks such as a cellular network (e.g., GSM [global system for mobile communications] or otherwise), a satellite based network, or any other type of network may be used to connect clients 902 and servers 906 in accordance with embodiments of the invention.

A network 904 such as the Internet connects clients 902 to server computers 906. Network 904 may utilize ethernet, coaxial cable, wireless communications, radio frequency (RF), etc. to connect and provide the communication between clients 902 and servers 906. Further, in a cloud-based computing system, resources (e.g., storage, processors, applications, memory, infrastructure, etc.) in clients 902 and server computers 906 may be shared by clients 902, server computers 906, and users across one or more networks. Resources may be shared by multiple users and can be dynamically reallocated per demand. In this regard, cloud computing may be referred to as a model for enabling access to a shared pool of configurable computing resources.

Clients 902 may execute a client application or web browser and communicate with server computers 906 executing web servers 910. Such a web browser is typically a program such as MICROSOFT INTERNET EXPLORER, MOZILLA FIREFOX, OPERA, APPLE SAFARI, GOOGLE CHROME, etc. Further, the software executing on clients 902 may be downloaded from server computer 906 to client computers 902 and installed as a plug-in or ACTIVEX control of a web browser. Accordingly, clients 902 may utilize ACTIVEX components/component object model (COM) or distributed COM (DCOM) components to provide a user interface on a display of client 902. The web server 910 is typically a program such as MICROSOFT'S INTERNET INFORMATION SERVER.

Web server 910 may host an Active Server Page (ASP) or Internet Server Application Programming Interface (ISAPI) application 912, which may be executing scripts. The scripts invoke objects that execute business logic (referred to as business objects). The business objects then manipulate data in database 916 through a database management system (DBMS) 914. Alternatively, database 916 may be part of, or connected directly to, client 902 instead of communicating/obtaining the information from database 916 across network 904. When a developer encapsulates the business functionality into objects, the system may be referred to as a component object model (COM) system. Accordingly, the scripts executing on web server 910 (and/or application 912) invoke COM objects that implement the business logic. Further, server 906 may utilize MICROSOFT'S TRANSACTION SERVER (MTS) to access required data stored in database 916 via an interface such as ADO (Active Data Objects), OLE DB (Object Linking and Embedding Data-Base), or ODBC (Open DataBase Connectivity).

Generally, these components 900-916 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 902 and 906 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 902 and 906. Embodiments of the invention are implemented as a software application (e.g., an inlet spacing generation application) on a client 902 or server computer 906. Further, as described above, the client 902 or server computer 906 may comprise a thin client device or a portable device that has a multi-touch-based display.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for dynamically defining and generating inlet spacing along a road in a building information model (BIM) computer aided design (CAD) three dimensional (3D) model, comprising:
   (a) acquiring, in a computer, a representation of the road in the BIM CAD 3D model, wherein the representation comprises a geometry for the road;
   (b) determining whether cost is a priority compared to construction efficiency as the priority;
   (c) based on the priority, defining an inlet spacing for the road;
   (d) determining inlet locations for inlets based on the inlet spacing;
   (e) determining whether the inlet spacing and inlets satisfy one or more design rules for the road;
   (f) determining that the inlet spacing and/or inlets fail to satisfy the one or more design rules for the road, and based thereon, selecting a different inlet spacing from a group of preset integers, and repeating the above steps beginning with the defining the inlet spacing; and
   (g) determining that the one or more design rules for the road are satisfied, and based thereon, outputting the inlet spacing and inlet locations for the road.

2. The computer-implemented method of claim 1, further comprising:
   (a) beginning at a crest of the road;
   (b) determining a first inlet location (of the inlet locations) for a first inlet (of the inlets) as a distance from the crest based on an allowable spread, wherein the determining also comprises analyzing a performance of the first inlet, wherein the analyzing determines a depth of the first inlet and a bypass flow of the first inlet;
   (c) assuming a maximum structure spacing as the inlet spacing to a next inlet;
   (d) determining a catchment area based on a catchment length, wherein the catchment length comprises the inlet spacing;
   (e) determining a catchment flow based on the catchment area;
   (f) determining a total gutter flow based on the catchment flow and the bypass flow;
   (g) determining a spread and a depth based on the next inlet, wherein the spread comprises a width of the total gutter flow, and the depth comprises a flow depth at a curb of the next inlet;
   (h) determining whether the spread and the depth comply with a design rule, wherein when the spread and the depth fail to comply with the design rule:
   (i) determining whether the inlet spacing is larger than a minimum value when the spread and the depth fail to comply with the design rule; and
   (j) when the inlet spacing is larger than a maximum value:
      (i) decreasing the inlet spacing;
      (ii) determining the first inlet location based on the decreased inlet spacing;
      (iii) repeating the above steps beginning with determining the catchment area;
   (k) determining an intercepted flow of the next inlet;

(l) determining whether the next inlet is at low point of the road;
(m) outputting the inlet spacing and inlet locations for the road when the next inlet is at a low point of the road; and
(n) when the next inlet is not at a low point of the road:
(1) determining whether a road profile or section of the road has changed;
(2) when the road profile or section of the road has changed, beginning a new group segment for the road using the maximum structure spacing as the inlet spacing to a next inlet, and repeating the above steps beginning with determining a catchment area; and
(3) when the road profile or section of the road has not changed, determining a next inlet location, and repeating the above steps beginning with determining a catchment area.

3. The computer-implemented method of claim 2, further comprising outputting a suggestion to change a design of the road when the inlet spacing is larger than the maximum value.

4. The computer-implemented method of claim 2, further comprising:
after determining the intercepted flow, checking an efficiency of the next inlet and providing a warning if the efficiency is below a threshold.

5. The computer-implemented method of claim 1, further comprising:
(a) determining that cost is the priority compared to construction efficiency as the priority;
(b) beginning at a crest of the road;
(c) determining a first inlet location (of the inlet locations) for a first inlet (of the inlets) as a distance from the crest based on an allowable spread, wherein the determining also comprises analyzing a performance of the first inlet, wherein the analyzing determines a depth of the first inlet and a bypass flow of the first inlet;
(d) determining a maximum total gutter flow based on the geometry for the road;
(e) determining a maximum catchment flow as the maximum total gutter flow minus a previous inlet bypass flow;
(f) determining a maximum catchment area (A) as the maximum catchment flow (Q) divided by a coefficient (C) and a rainfall intensity (I) (A=Q/CI);
(g) determining a catchment length as the maximum catchment area divided by a width of the catchment area;
(h) determining whether the catchment length is larger than or equal to a minimum length;
(i) defining the inlet spacing as the catchment length when the catchment length is larger than or equal to the minimum length, wherein a current inlet location for a current inlet is placed based on the inlet spacing from a prior inlet location;
(j) determining if the geometry for the road is changing after the current inlet location;
(k) updating the geometry for the road and repeating the above steps beginning with determining the maximum total gutter flow when the geometry for the road changes after the current inlet location;
(l) calculating an intercepted flow by a type and size of the current inlet when the geometry for the road is not changing after the current inlet location;
(m) determining whether the current inlet is at a low point of the road;
(n) outputting the current inlet spacing and inlet locations for the road when the current inlet is at a low point of the road; and
(n) selecting a different inlet spacing and repeating the above steps beginning with determining the maximum catchment flow when the current inlet is not at a low point of the road.

6. The computer-implemented method of claim 5, further comprising:
outputting a suggestion to change a design of the road when the catchment length is not larger than or equal to a minimum length.

7. The computer-implemented method of claim 5, further comprising:
after determining the intercepted flow, checking an efficiency of the current inlet and providing a warning if the efficiency is below a threshold.

8. The computer-implemented method of claim 1, wherein the outputting comprises constructing the inlets at the inlet locations.

9. A computer system for dynamically defining and generating inlet spacing along a road in a building information model (BIM) computer aided design (CAD) three dimensional (3D) model comprising:
(a) a computer having a memory;
(b) an inlet spacing generation application executing on the computer, wherein the inlet spacing generation application:
(1) acquires, in a computer, a representation of the road in the BIM CAD 3D model, wherein the representation comprises a geometry for the road;
(2) determines whether cost is a priority compared to construction efficiency as the priority;
(3) based on the priority, defines an inlet spacing for the road;
(4) determines inlet locations for inlets based on the inlet spacing;
(5) determines whether the inlet spacing and inlets satisfy one or more design rules for the road;
(6) determines that the inlet spacing and/or inlets fail to satisfy the one or more design rules for the road, and based thereon, selects a different inlet spacing from a group of preset integers, and repeats the above beginning with defining the inlet spacing; and
(7) determines that the one or more design rules for the road are satisfied, and based thereon, outputs the inlet spacing and inlet locations for the road.

10. The computer system of claim 9, wherein the inlet spacing generation application:
(a) begins at a crest of the road;
(b) determines a first inlet location (of the inlet locations) for a first inlet (of the inlets) as a distance from the crest based on an allowable spread, wherein the determining the first inlet location also comprises analyzing a performance of the first inlet, wherein the analyzing determines a depth of the first inlet and a bypass flow of the first inlet;
(c) assumes a maximum structure spacing as the inlet spacing to a next inlet;
(d) determines a catchment area based on a catchment length, wherein the catchment length comprises the inlet spacing;
(e) determines a catchment flow based on the catchment area;
(f) determines a total gutter flow based on the catchment flow and the bypass flow;

(g) determines a spread and a depth based on the next inlet, wherein the spread comprises a width of the total gutter flow, and the depth comprises a flow depth at a curb of the next inlet;
(h) determines whether the spread and the depth comply with a design rule, wherein when the spread and the depth fail to comply with the design rule:
(i) determines whether the inlet spacing is larger than a minimum value when the spread and the depth fail to comply with the design rule; and
(j) when the inlet spacing is larger than a maximum value:
  (i) decreases the inlet spacing;
  (ii) determines the first inlet location based on the decreased inlet spacing;
  (iii) repeats the above beginning with the determines the catchment area;
(k) determines an intercepted flow of the next inlet;
(l) determines whether the next inlet is at low point of the road;
(m) outputs the inlet spacing and inlet locations for the road when the next inlet is at a low point of the road; and
(n) when the next inlet is not at a low point of the road:
  (1) determines whether a road profile or section of the road has changed;
  (2) when the road profile or section of the road has changed, begins a new group segment for the road using the maximum structure spacing as the inlet spacing to a next inlet, and repeats the above beginning with determines a catchment area; and
  (3) when the road profile or section of the road has not changed, determines a next inlet location, and repeating the above steps beginning with determining a catchment area.

11. The computer system of claim 10, wherein the inlet spacing generation application outputs a suggestion to change a design of the road when the inlet spacing is larger than the maximum value.

12. The computer system of claim 10, wherein the inlet spacing generation application:
after determining the intercepted flow, checking an efficiency of the next inlet and providing a warning if the efficiency is below a threshold.

13. The computer system of claim 9, wherein the inlet spacing generation application:
(a) determines that cost is the priority compared to construction efficiency as the priority;
(b) begins at a crest of the road;
(c) determines a first inlet location (of the inlet locations) for a first inlet (of the inlets) as a distance from the crest based on an allowable spread, wherein the determines a first inlet location also analyzes a performance of the first inlet, wherein the analyzing determines a depth of the first inlet and a bypass flow of the first inlet;
(d) determines a maximum total gutter flow based on the geometry for the road;
(e) determines a maximum catchment flow as the maximum total gutter flow minus a previous inlet bypass flow;
(f) determines a maximum catchment area (A) as the maximum catchment flow (Q) divided by a coefficient (C) and a rainfall intensity (I) (A=Q/CI);
(g) determines a catchment length as the maximum catchment area divided by a width of the catchment area;
(h) determines whether the catchment length is larger than or equal to a minimum length;
(i) defines the inlet spacing as the catchment length when the catchment length is larger than or equal to the minimum length, wherein a current inlet location for a current inlet is placed based on the inlet spacing from a prior inlet location;
(j) determines if the geometry for the road is changing after the current inlet location;
(k) updates the geometry for the road and repeating the above beginning with determining the maximum total gutter flow when the geometry for the road changes after the current inlet location;
(l) calculates an intercepted flow by a type and size of the current inlet when the geometry for the road is not changing after the current inlet location;
(m) determines whether the current inlet is at a low point of the road;
(n) outputs the current inlet spacing and inlet locations for the road when the current inlet is at a low point of the road; and
(n) selects a different inlet spacing and repeating the above beginning with determining the maximum catchment flow when the current inlet is not at a low point of the road.

14. The computer system of claim 13, wherein the inlet spacing generation application:
outputs a suggestion to change a design of the road when the catchment length is not larger than or equal to a minimum length.

15. The computer system of claim 13, wherein the inlet spacing generation application:
after determining the intercepted flow, checks an efficiency of the current inlet and providing a warning if the efficiency is below a threshold.

16. The computer system of claim 9, further comprising constructing the inlets at the inlet locations.

* * * * *